(12) United States Patent
Liu

(10) Patent No.: US 10,380,761 B2
(45) Date of Patent: Aug. 13, 2019

(54) LOCATING METHOD, LOCATOR, AND LOCATING SYSTEM FOR HEAD-MOUNTED DISPLAY

(71) Applicant: Wistron Corporation, New Taipei (TW)

(72) Inventor: Wei-Lun Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/856,073

(22) Filed: Dec. 28, 2017

(65) Prior Publication Data
US 2019/0114803 A1    Apr. 18, 2019

(30) Foreign Application Priority Data

Oct. 13, 2017  (TW) .............................. 106135189 A

(51) Int. Cl.
*H04N 5/232* (2006.01)
*G06T 7/73* (2017.01)
(52) U.S. Cl.
CPC ........... *G06T 7/74* (2017.01); *H04N 5/23296* (2013.01); *G06T 2207/30204* (2013.01)

(58) Field of Classification Search
None
See application file for complete search history.

(56) References Cited

U.S. PATENT DOCUMENTS

2018/0330521 A1* 11/2018 Samples ................... G06T 7/85
2018/0373412 A1* 12/2018 Reif .................... G06F 3/04815

* cited by examiner

*Primary Examiner* — Eileen M Adams
(74) *Attorney, Agent, or Firm* — JCIPRNET

(57) ABSTRACT

A locating method, a locator, and a locating system for head-mounted display (HMD) are proposed. The method includes the following steps. A locator is provided and disposed on the HMD, where the locator includes an image capturing device and a communication interface, and the locator is connected to the HMD via the communication interface. An image of a reference object is captured by the locator through the image capturing device in an operating space to generate a first reference object image. A relative position of the HMD and the reference object is calculated by the locator according to the first reference object image so as to obtain locating information of the HMD in the operating space, and the locating information is transmitted to the HMD by the locator.

23 Claims, 7 Drawing Sheets

LOCATING METHOD, LOCATOR, AND LOCATING SYSTEM FOR HEAD-MOUNTED DISPLAY

CROSS-REFERENCE TO RELATED APPLICATION

This application claims the priority benefit of Taiwan application serial no. 106135189, filed on Oct. 13, 2017. The entirety of the above-mentioned patent application is hereby incorporated by reference herein and made a part of this specification.

TECHNICAL FIELD

The disclosure relates to a locating method, a locator, and a locating system, in particular to, a locating method, a locator, and a locating system for a head-mounted display (HMD).

BACKGROUND

A HMD was intended mainly for military applications when it was first introduced. With the advancement of the technology, reduced manufacturing cost, lightweight and compact structure of key components such as display, gyroscope, spatial sensor, the HMD has been extended to the consumer level for virtual reality (VR), augmented reality (AR), and mixed reality (MR) that offer visual enjoyment as compared to conventional display systems. For example, virtual reality creates an illusion of reality with images, sounds, and other sensations that replicate a real environment or an imaginary setting through the use of pairs of images provided by a near-eye display along with a gyroscope and a motion sensor. A virtual reality environment would offer a user immersion, navigation, and manipulation that simulate his physical presence in the real world or imaginary world.

Conventional approaches to locate a motion sensing equipment in a VR system would mainly be an outside-in tracking or inside-out tracking, where infrared LED elements or along with cameras are used for tracking and locating in a fixed space. However, the two approaches would require high hardware cost. Moreover, the setup would be highly difficult, and the spatial locating procedure would be complicated.

SUMMARY OF THE DISCLOSURE

Accordingly, a locating method, a locator, and a locating system for a HMD are proposed, where the HMD is able to be located in a low cost and simple manner with no additional hardware equipment required to be setup in an operating space.

According to one of the exemplary embodiments, the locating method includes the following steps. A locator is provided and disposed on the HMD, where the locator includes an image capturing device and a communication interface, and the locator is connected to the HMD via the communication interface. An image of a reference object is captured by the locator through the image capturing device in an operating space to generate a first reference object image. A relative position of the HMD and the reference object is calculated by the locator according to the first reference object image so as to obtain locating information of the HMD in the operating space, and the locating information is transmitted to the HMD by the locator.

According to one of the exemplary embodiments, the locator includes an image capturing device, a communication interface, a data storage device, and a processor, where the processor is coupled to the image capturing device, the communication interface, and the data storage device. The image capturing device is configured to capture an image of a reference object in an operating space to generate a first reference object image. The communication interface is configured to connect to the HMD. The data storage device is configured to store data. The processor is configured to calculate a relative position of the HMD and the reference object according to the first reference object image to obtain locating information of the HMD in the operating space and transmit the locating information to the HMD by the locator.

According to one of the exemplary embodiments, the locating system includes a reference object, a locator, and a HMD, where the locator is disposed on and connected to the HMD. The locator is configured to capture an image of a reference object in an operating space to generate a first reference object image, calculate a relative position of the HMD and the reference object according to the first reference object image to obtain locating information of the HMD in the operating space, and transmit the locating information to the HMD.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
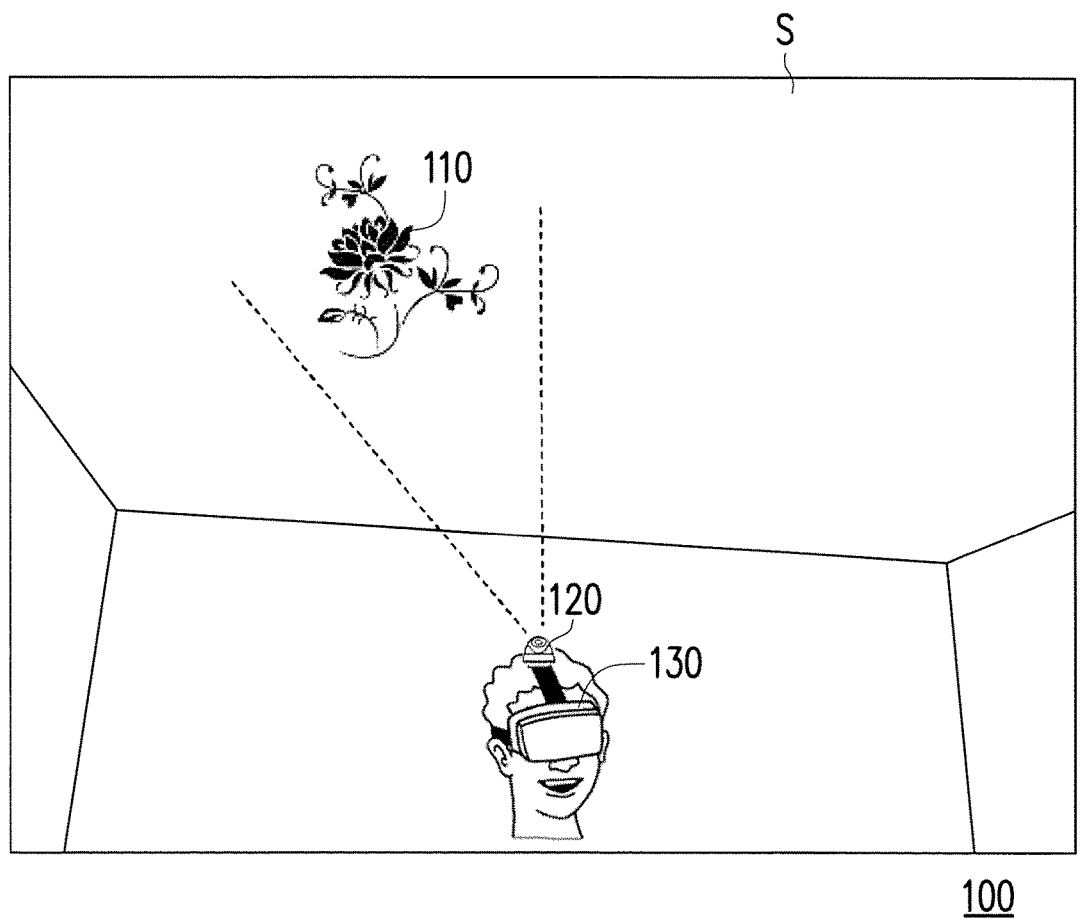
FIG. 1 illustrates a schematic diagram of a proposed locating system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

For comprehension purposes, only a VR HMD would be illustrated in FIG. 1 to FIG. 6B, and yet the disclosure is not limited in this regard. In fact, the disclosure may also be applicable to other HMDs for AR, MR, or the like. FIG. 1 illustrates a schematic diagram of a proposed locating system in accordance with one of the exemplary embodiments of the disclosure. All components of the locating system and their configurations are first introduced in FIG. 1. The functionalities of the components are disclosed in more detail in conjunction with FIG. 2A.

Referring to FIG. 1, a locating system 100 would include a reference object 110, a locator 120, and a VR HMD 130, where the locator 120 would be disposed on the VR HMD 130. In the present exemplary embodiment, the locating system 100 would locate the VR HMD 130 in an operating space S. It should be noted that, the operating space S herein may be an indoor space including an entire closed indoor space and a semi-closed indoor space. However, the operating space S may also be an outdoor space having physical or virtual boundaries. Any space that allows the reference object 110 to be placed and boundaries to be defined may be the operating space in the disclosure.

In the present exemplary embodiment, the reference object may be an image having a direction, e.g. a graph with a recognizable directional pattern, a picture, or a photo. The locator 120 would include an image capturing device, a communication interface, a processor, and a data storage device and perform locating features based on image analysis. Detailed description on the hardware components would be provided later on.

In the case where the reference object 110 is a graph, such graph may contain a pattern with no symmetric axis or a pattern with one symmetric axis. On the other hand, a pattern with two or more symmetric axes with an unrecognizable direction (e.g. circle, square) would not be used. In the case where the reference object 110 is a picture or a photo, a certain amount of feature points would be required for image recognition that would be performed by the locator 120. It should be noted that, during the manufacturing process, several graphs supported by the locator 120 may be pre-stored in the data storage device. Also, such graphs may also be stored in a cloud server for the user to download, and the downloaded graph may be the reference object 110. Hence, the performance on image recognition during the locating processor may be optimized. Moreover, since the supported graphs are considered as known information, the processor of the locator 120 may be downgraded to a lower level to reduce hardware cost.

In another exemplary embodiment, the reference object 110 may also be a particular object selected from the operating space S. It may be any 2D or 3D object having a recognizable direction as well as multiple feature points as described above. Before the locator 120 perform is locating, it may capture an image of such object and upload to, for example, a cloud server for feature recognition. Once the cloud server sends the feature recognition result back to the locator 120, and the locator 120 may save such result in the storage device of the locator 120 for an optimized efficiency during its locating process.

The VR HMD 130 may be implemented by a display headset or goggles. The display may be, for example, a liquid-crystal display (LCD), a light-emitting diode (LED) display such as a OLED display or micro LED display, or the like. The VR HMD 130 may obtain its own locating information from the locator 120 via the communication interface and transmit the locating information to a host (not shown) also via the communication interface either through wire or wireless transmission as known per se. The host may transmit VR image content to the VR HMD 130 for display based on the locating information. It should be noted that the VR HMD 130 and the host (e.g. a computer) in the aforementioned exemplary embodiment may be a split system, and yet the VR HMD 130 and the host may be integrated into an all-in-one system in another exemplary embodiment.

Figure 2A:
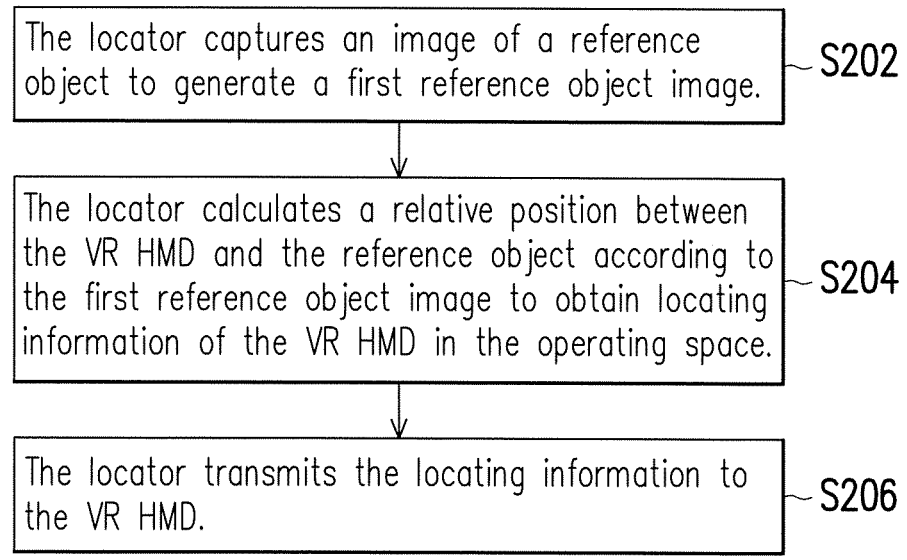
FIG. 2A illustrates a flowchart of a locating method in accordance with one of the exemplary embodiments of the disclosure.
Figure 2B:
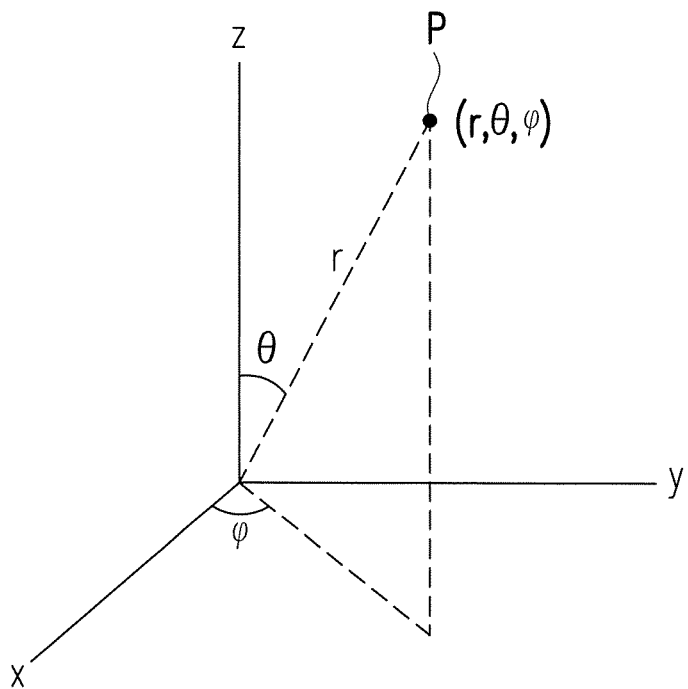
FIG. 2B illustrates a schematic diagram of a spherical coordinate in accordance with one of the exemplary embodiments of the disclosure.

FIG. 2A illustrates a flowchart of a locating method in accordance with one of the exemplary embodiments of the disclosure. The steps of FIG. 2A could be implemented by the locating system 100 as illustrated in FIG. 1. In, the present exemplary embodiment, the reference object 110 may be an image with a special pattern and fixedly placed on the ceiling in the operating space S. In another exemplary embodiment, the reference object 110 may be placed on a wall perpendicular to a horizontal plane in the operating space S and higher than the locator 120 to obtain a better image recognition result. It should be noted that, since the locator 120 is placed on top of the VR HMD 130 merely with a known distance apart, it is assumed that the position of the locator 120 and the position of the VR HMD 130 are the same in the following description.

Referring to FIG. 1 and FIG. 2A, the locator 120 would capture an image of the reference object 110 to generate a first reference object image (Step S202). Next, the locator 120 would calculate a relative position between the VR HMD 130 and the reference object according to the first reference object image to obtain locating information of the VR HMD 130 in the operating space (Step S204). The relative position may be, for example, a distance as well as a tilt angle and a rotation angle with respect to a horizontal plane between the HMD and the reference object. The locating information may be expressed as an absolute location of the operating space S.

In detail, based on the nature of imaging, as the distance between the locator 120 and the reference object 110 gets closer, the reference object appearing in the first reference object image would become larger. As the distance between the locator 120 and the reference object 110 gets farther, the reference object appearing in the first reference object image would become smaller. The locator 120 may then calculate the distance between the VR HMD 130 and the reference object 110 based on such relationship. On the other hand, when there exists a tilt angle between the locator 120 and the reference object 110 with respect to a horizontal direction, the reference object appearing in the first reference object image would be distorted in a different degree of levels due to different angle of views of the locator 120. Hence, the locator 120 may calculate the tilt angle between the VR HMD 130 and the reference object 110 based on the degree of level of the distortion of the reference object appearing in the first reference object image. Moreover, the locator 120 may calculate the plane rotation angle between the locator 120 and the reference object 110 based on an orientation of the reference object appearing in the first reference object image.

The relative position of the VR HMD 130 and the reference object 110 calculated by the locator 120 may be represented as a spherical coordinate, i.e. (r, θ, φ), where r, θ, and φ are respectively a radial distance, a tilt angle, and a plane rotation angle between the locator 120 and the reference object 110. The locator 120 may further convert (r, θ, φ) to the locating information of the operating space S, for example, represented as a Cartesian coordinate, (x, y, z). Next, the locator 120 may transmit the locating information to the VR HMD 130 (Step S206) for VR image content display on the VR HMD in the follow-up step. Take FIG. 2B as an example, in which a schematic diagram of a spherical coordinate is illustrated in accordance with an exemplary embodiment of the disclosure. Assume that a spherical coordinate of a point P is (r, θ, φ), then an absolute coordinate of the point P may be expressed as (x, y, z)=(r(sin θ cos φ), r(sin θ sin φ), r(cos θ)).

As compared to the conventional locating systems in VR which require high hardware cost and difficult setup, the user in the present exemplary embodiment would only require to place the reference object 110 in the operating space S as well as few simple steps to complete the setup of the locating system 100. To be specific, FIG. 3A illustrates a flowchart of a setup procedure of a locating method in accordance with one of exemplary embodiments of the disclosure, and FIG. 3B illustrates a plan view of an operating space in accordance with one of exemplary embodiments of the disclosure.

Figure 3A:
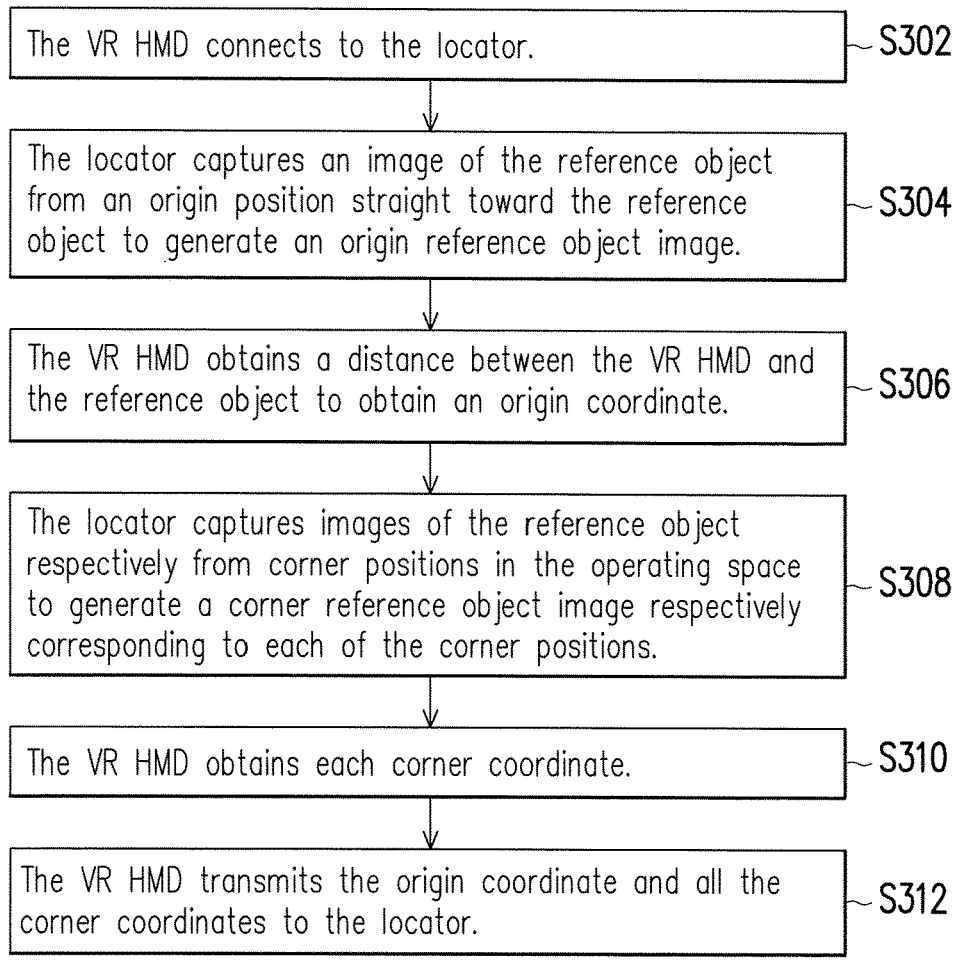
FIG. 3A illustrates a flowchart of a setup procedure of a locating method in accordance with one of exemplary embodiments of the disclosure.
Figure 3B:
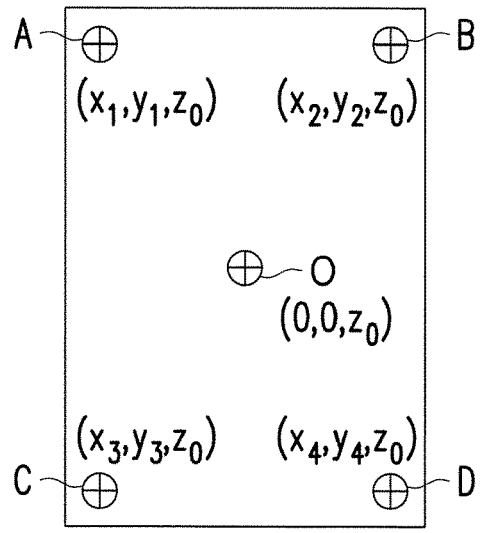
FIG. 3B illustrates a plan view of an operating space in accordance with one of exemplary embodiments of the disclosure.

Referring to both FIG. 1 and FIG. 3A, after the reference object 110 has been placed, the VR HMD 130 would connect to the locator 120 (Step S302). In the present exemplary embodiment, the VR HMD 130 would be corresponding to an application recording the previously-connected locator 120. When the application is launched and the VR HMD 130 has not yet connected to the locator 120, the application would request the locator 120 for connection. Assume that the application does not record any previously-connected locator 120 or needs to connect to other locators, it would provide a user interface for user selection.

Next, the locator 120 would capture an image of the reference object 110 from an origin position straight toward the reference object to generate an origin reference object image (Step S304), and the VR HMD 130 would obtain a distance between the VR HMD and the reference object to obtain an origin coordinate (Step S306). Assume that the reference object 110 would be placed on the ceiling, and the origin position would be right under the reference object 110. In other words, the user would wear the VR HMD 130 and stand right under the reference object 110 so as to allow the locator 120 to capture an image straight toward the reference object 110. After the locator 120 captures the image and identifies the reference object 110 therefrom, the user interface of the application of the VR HMD 130 would either request the user to enter the distance between the VR HMD 130 and the reference object 110 or determine the distance based on the size of the reference object 110 appearing in the image with a given actual size of the reference object 110. As an example of FIG. 3B, assume that O is an origin position with coordinate (0,0, $z_0$), where $z_0$ is a distance between the VR HMD 130 and the reference object 110 at the origin position O.

After the locator 120 captures images and identifies the reference object 110 therefrom, the locator 120 would determine and keep tracking on the current position of the reference object 110. Next, when the user with the VR HMD 130 moves to different corners in the operating space S, the locator 120 would capture images of the reference object 120 from all corner positions in the operating space S to generate a corner reference object image respectively corresponding to each of the corner positions (Step S308), and the VR HMD would obtain each corner coordinate (Step S310). After the locator 120 captures the images and identifies the reference object 110 therefrom, the user interface of the application of the VR HMD 130 would either request the user to enter the distance between the VR HMD 130 and the reference object 110 or determine corner position coordinates based on the size of the reference object 110 appearing in the images with a given actual size of the reference object 110. As an example of FIG. 3B, assume that A, B, C, and D are four corner positions respectively with coordinates, $(x_1, y_1, z_0)$ $(x_2, y_2, z_0)$, $(x_3, y_3, z_0)$, and $(x_4, y_4, z_0)$. Coordinates of other positions in the operating space S may be estimated by interpolation as known per se.

Moreover, the VR HMD 130 may define boundaries for activities in the operating space S to prevent the user from bumping into walls or collisions with physical objects while in the virtual world. Next, the VR HMD 130 would transmit the origin coordinate and all the corner coordinates to the locator 120 (Step S312) and complete the setup.

In case of the locator 120 unable to capture images of the reference object 110 at some instant moments due to the continuous movement of the VR HMD 130, a fast response and tracking mechanism that automatically controls the locator 120 based on the movement of the VR HMD 130 for a more precise locating approach would be introduced hereafter.

Figure 4:
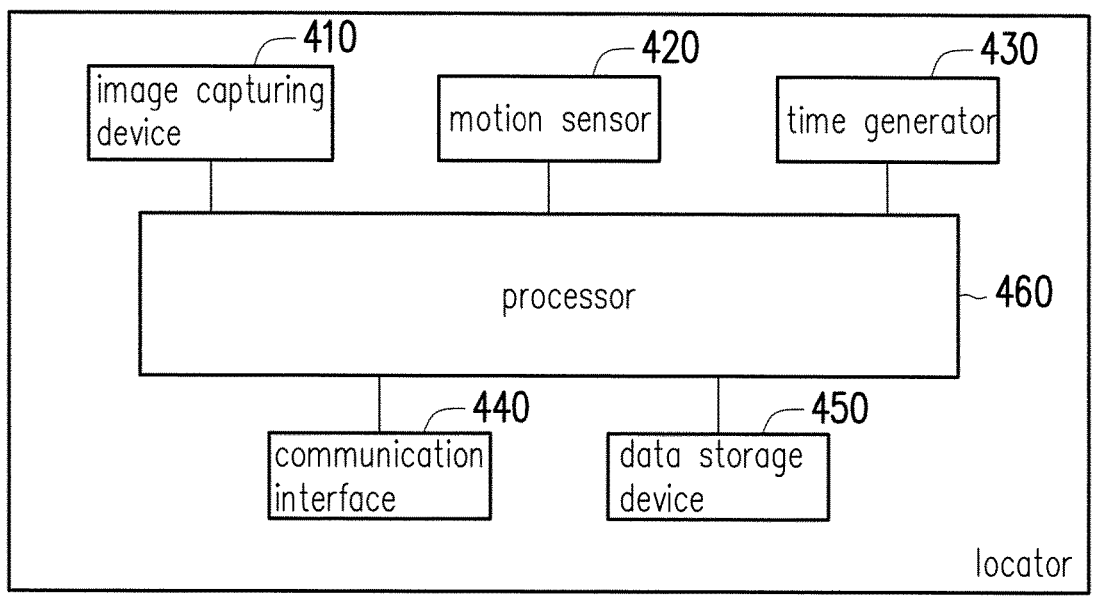
FIG. 4 illustrates a block diagram of a locator in accordance with one of exemplary embodiments of the disclosure.

FIG. 4 illustrates a block diagram of the locator 120 in accordance with one of exemplary embodiments of the disclosure, and yet the disclosure is not limited in this regard. All components of the locator 120 and their configurations are first introduced in FIG. 4. The functionalities of the components are disclosed in more detail in conjunction with FIG. 5.

Referring to FIG. 4, the locator 120 would include an image capturing device 410, a motion sensor 420, a time generator 430, a communication interface 440, a data storage device 450, and a processor 460.

The image capturing device 410 would be configured to capture its front images and include a camera lens having an optical lens and a sensing element. The sensing element would be configured to sense intensity entering the optical lens to thereby generate images. The sensing element may be, for example, charge-coupled-device (CCD) elements, complementary metal-oxide semiconductor (CMOS) elements. The disclosure is not limited in this regard. A field of view (FOV) of the image capturing device 410 may be, for example, 120°.

The motion sensor 420 may be a combination of an accelerometer, a gyroscope and a magnetometer to detect the movement and the rotation of the VR HMD 130 or the locator 120. It should be noted that the motion sensor 420 may be only one or two of the accelerometer, the gyroscope, and the magnetometer based on actual specification and cost budget.

The time generator 430 would be configured to provide time and may be an electronic device or integrated circuits that outputs precise time, such as a real-time clock (RTC).

The communication interface 440 would be configured to perform data transmission with the VR MD 130 and may be a wireless transmission interface that support short-distance transmission and with low power consumption and low cost, such as a Bluetooth. In other exemplary embodiments, the communication interface 440 may be a connection interface to provide a wire transmission with the VR HMD 130, such as a USB.

The data storage device 450 would be configured to store data such as images and programming codes and may one or a combination of a stationary or mobile random access memory (RAM), a read-only memory (ROM), a flash memory, a hard drive, other similar devices or integrated circuits.

The processor 460 would be configured to control the operation among the components of the locator 120 and may be, for example, a field programmable gate array (FPGA), a programmable logic device (PLD), an application specific integrated circuit (ASIC), a central processing unit (CPU), an application processor (AP), or other programmable devices for general purpose or special purpose such as a microprocessor and a digital signal processor (DSP), a graphics processing unit (GPU), or other similar devices, chips, integrated circuits or a combination of aforementioned devices.

Moreover, one of ordinary skilled in the art would understand that the locator 120 would further include a battery unit that provides power for the locator 120. The locator 120 would also include a servo unit configured to carry the image capturing device 410 and controlled by the processor 460. The servo unit may include an x-axis servo to control the movement of the image capturing device 410 in an x-direction as well as a z-axis servo to control the movement of the image capturing device 410 in an z-direction.

Figure 5A:
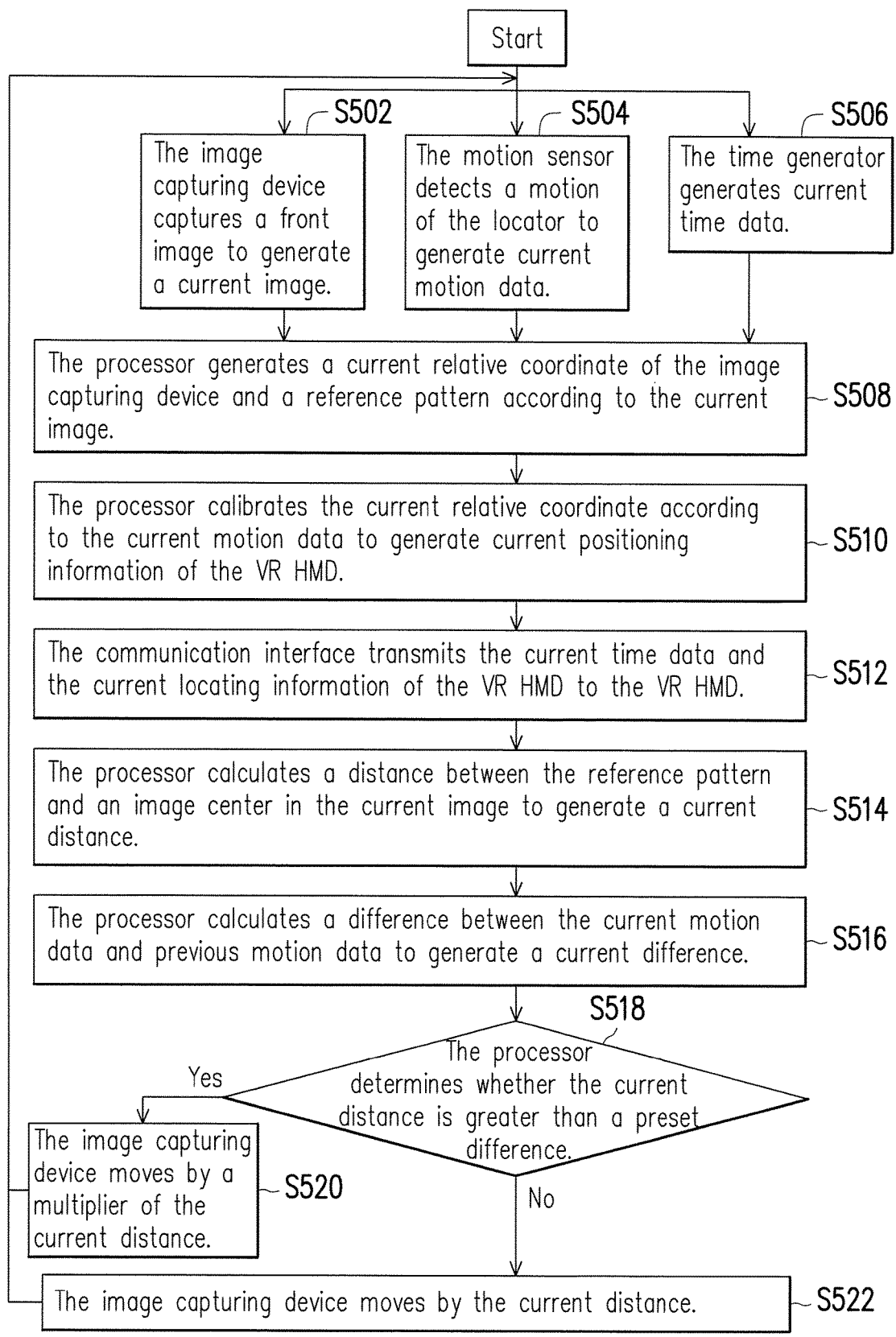
FIG. 5A illustrates a flowchart of a locating method in accordance with one of exemplary embodiments of the disclosure.

FIG. 5A illustrates a flowchart of a locating method in accordance with one of exemplary embodiments of the disclosure. The steps of FIG. 5A could be implemented by the locating system 100 as illustrated in FIG. 1.

Referring to FIG. 1, FIG. 4, and FIG. 5A, the image capturing device 410 of the locator 120 would capture a front image to generate a current image (Step S502). The motion sensor 420 would detect a motion of the locator 120 to generate current motion data (Step S504). The time generator 430 would generate current time data (Step S506). The current image captured by the image capturing device 410 would include an image of the reference object 110. The current motion data would be an angle difference with respect to a horizontal plane of the locator 102 and an acceleration of the locator 120 at a same time point. The current time data may be a timestamp of the aforementioned time point.

After the processor 460 of the locator 120 reads the current image, the current motion data, and the current time data, it would generate a current relative coordinate of the image capturing device 410 and a reference pattern of the reference object 110 according to the current image (Step S508) and calibrate the current relative coordinate according to the current motion data to generate current positioning information of the VR HMD 130 (Step S510). Next, the communication interface 440 would transmit the current time data and the current locating information of the VR HMD 130 to the VR HMD 130 (Step S512). To be specific, assume that the current relative coordinate of the image capturing device 410 and the reference pattern (i.e. the reference object 110) may be expressed as $P_{cam}=(r_{cam}, \theta_{cam}, \phi_{cam})$. The processor 460 would obtain the angle difference $(\theta_d, \phi_d)$ with respect to the horizontal plane, and obtain the rotation angle $(\theta_s, \phi_s)$ of the image capturing device 410 via the servo unit. The current relative coordinate of the VR HMD 130 would be calibrated to $P_{vr}=(r_{vr}, \theta_{vr}, \phi_{vr})=(r_{cam}, \theta_{cam}-\theta_d-\theta_s, \phi_{cam}-\phi_d-\phi_s)$. The processor 460 would next convert the calibrated current relative coordinate to a Cartesian coordinate $P_{vr}=(x_{vr}, y_{vr}, z_{vr})$ and set it as the current locating information.

On the other hand, to maintain a best viewing angle of the reference object 110 from the image capturing device 410, i.e. to ensure that the image of the reference object 110 is near an image center, the image capturing device 410 would continuously track the reference object 110. Hence, while the VR HMD 130 is rapidly moving, the processor 460 would predict and adjust the moving trajectory of the image capturing device 410 to avoid losing track of the reference object 110.

Figure 5B:
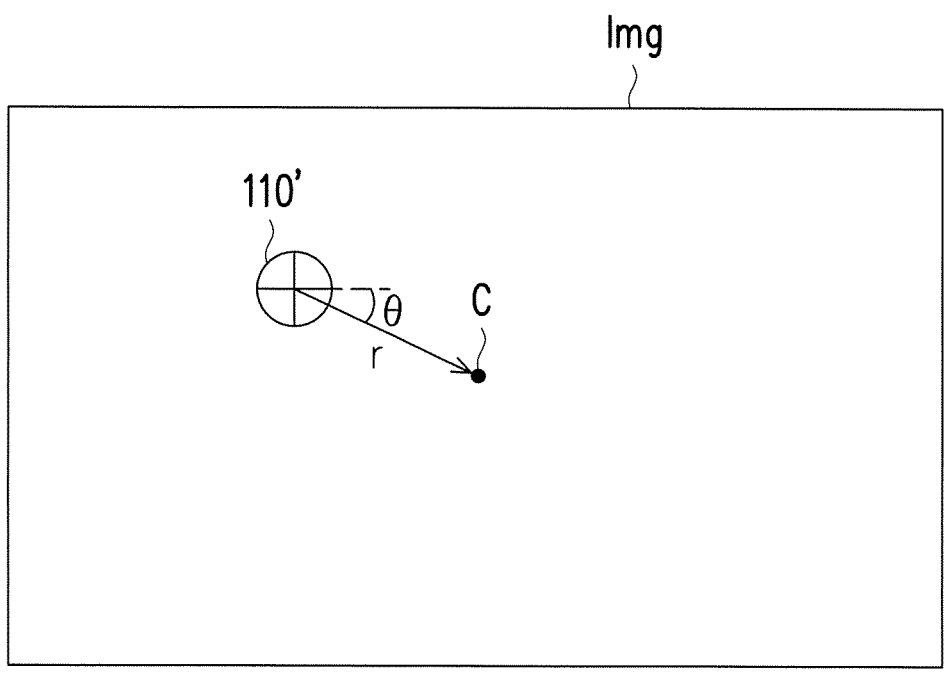
FIG. 5B illustrates a schematic diagram of a current image in accordance with one of exemplary embodiments of the disclosure.

In detail, the processor 460 of the locator 120 would calculate a distance between the particular pattern and an image center in the current image to generate a current distance (Step S514). To be specific, FIG. 5B illustrates a schematic diagram of a current image in accordance with one of exemplary embodiments of the disclosure. A current distance between a reference pattern 110' and a center point C in a current image Img may be expressed as $\vec{d}=(r, \theta)$.

Next, the processor 460 would calculate a difference between the current motion data and previous motion data to generate a current difference (Step S516) and determine whether the current distance is greater than a preset difference (Step S518). However, before the image capturing device 410 is moved, the processor 460 would determine a moving speed of the VR HMD 130 to decide the amount of distance that the image capturing device 410 needs to move. Hence, the processor 460 would calculate a difference between the current motion data and the previous motion data $D(t-1, t)$ and determine whether the difference is greater than a preset difference S, where t is the current time data. Such preset difference would be a threshold and associated with a system response time of the locator 120 as well as a FOV of the image capturing device 410. When the system response time of the locator 120 is faster, the preset difference would be larger. When the FOV of the image capturing device 410 is larger, the preset difference would be larger, and otherwise, the preset difference would be smaller.

Hence, when the current difference is larger than the preset difference (i.e. $D(t-1, t)>S$), the image capturing device 410 would move by a multiplier of the current distance (Step S520). Such multiplier may be denoted as SD, where SD>1 (e.g. 1.5). In such situation, it means that the user with the VR HMD 130 moves faster, and the image capturing device 410 would move $SD \times \vec{d}$. That is, when the VR HMD 130 moves faster, the moving distance of the image capturing device 410 would be larger, and otherwise, the moving distance would be smaller.

When the current difference is not greater than the preset difference (i.e. $D(t-1, t)<S$), the image capturing device 410 would move by the current distance (Step s522). In such situation, it means that the user with the VR HMD 130 moves slower, and the image capturing device 410 would move $\vec{d}$.

After the image capturing device 410 moves, it would capture from a different view angle, and the flow would return to Step S502 in which the image capturing device 410 would capture another front image.

Figure 6A:
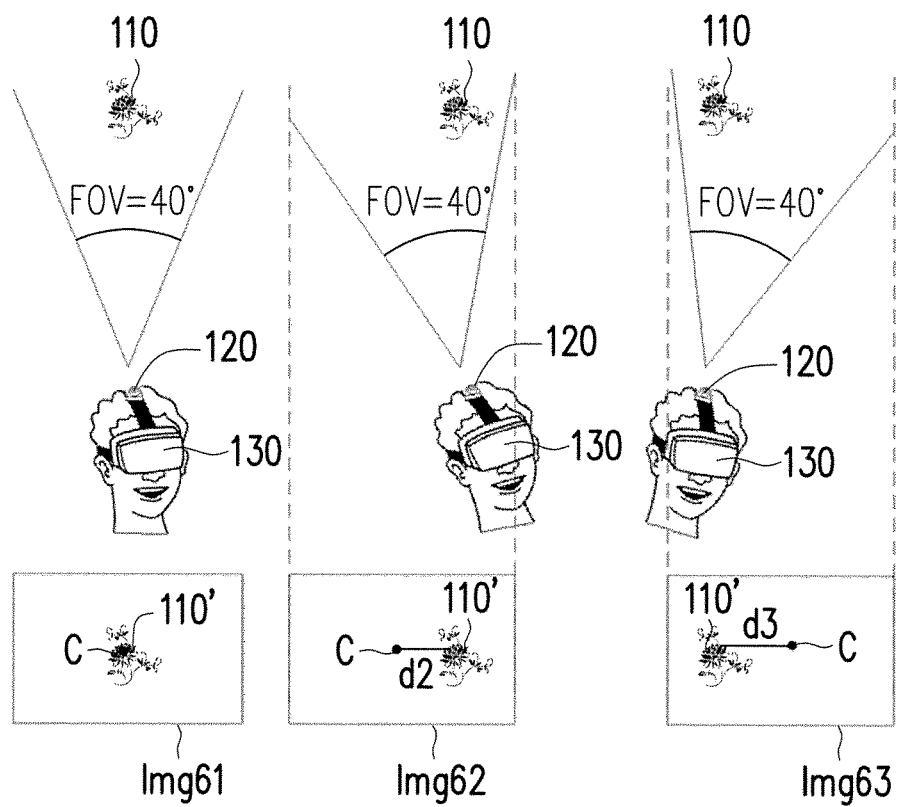
FIG. 6A illustrates scenario diagrams of a locating method in accordance with one of exemplary embodiments of the disclosure.
Figure 6B:
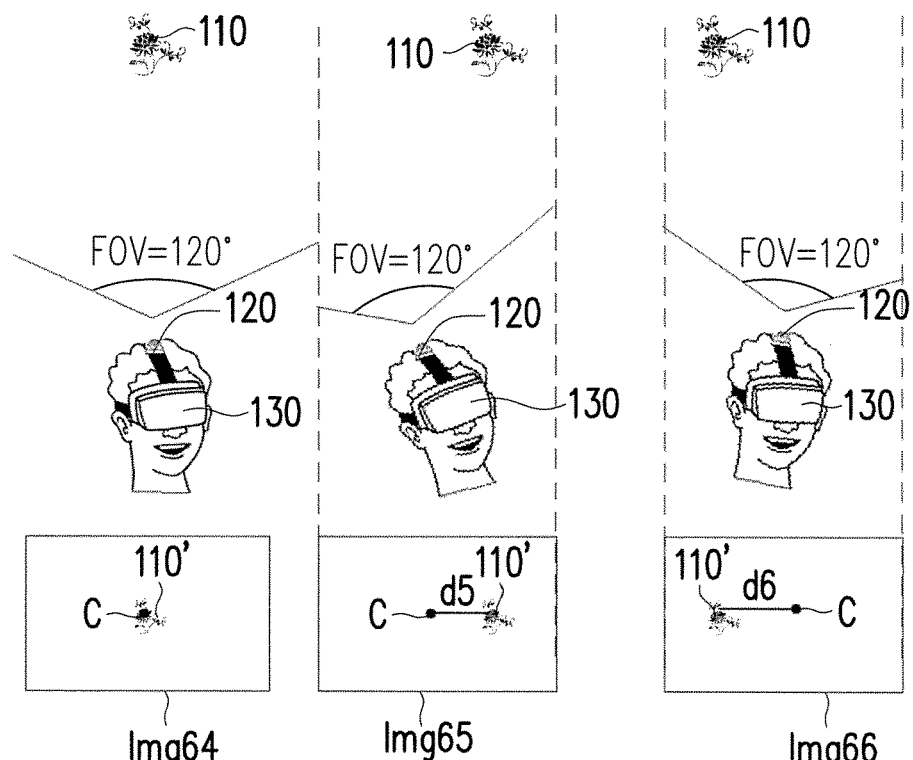
FIG. 6B illustrates scenario diagrams of a locating method in accordance with one of exemplary embodiments of the disclosure.

FIG. 6A and FIG. 6B illustrate scenario diagrams of a locating method in accordance with one of exemplary embodiments of the disclosure.

Referring first to FIG. 6A, the FOV of the image capturing device 410 would be 40°, and thus the reference object 110 would appear in a larger size in captured images. When the user's head is straight toward the reference object 110, the reference object 110' in an image Img 61 captured by the image capturing device 410 would be at a center point C. When the head of the user is tilted at 30° to the left, the reference object 110' in an image Img 62 captured by the image capturing device 410 would be at a distance of d2 to the right of the center point C. When the head of the user is tilted at 30° to the right, the reference object 110' in an image Img 63 captured by the image capturing device 410 would be at a distance of d3 to the left of the center point C.

Referring now to FIG. 6B, the FOV of the image capturing device 410 would be 120°, and thus the reference object 110 would appear in a smaller size in captured images. When the user's head is straight toward the reference object 110, the reference object 110' in an image Img 64 captured by the image capturing device 410 would be at the center point C. When the head of the user is tilted at 30° to the left, the reference object 110' in an image Img 65 captured by the image capturing device 410 would be at a distance of d5 to the right of the center point C. When the head of the user is tilted at 30° to the right, the reference object 110' in an image Img 66 captured by the image capturing device 410 would be at a distance of d6 to the left of the center point C.

Hence, even if the head of the user is tilted at the same angle, different FOVs would result in different moving distances, i.e. d2>d5 and d3>d6. Briefly speaking, assume that the preset difference is S. When the FOV is larger, it means that the value of S is larger, and otherwise, the value of S is smaller. Assume that the preset difference S is set to the amount of ¼ of the image. When the FOV is 40°, both d2 and d3 are greater than S, and therefore a moving distance would be multiplied by a multiplier SD (e.g. 1.5) to ensure that the reference pattern 110' appears at the center C in the image. Table 1 illustrates angles of the image capturing device 410 need to be moved in the scenarios as illustrated in FIG. 6A and FIG. 6B.

Additionally, take the user's head moving 30° to the left with an acceleration of "a" and the distance between the reference object 110' and the center C being d2 as an example. When the system response time of the locator 120 is two times faster, the distance between the reference object 110' and the center C would be d2/2, where d2/2<S. That is, the tolerance of the system of the locator 120 on the preset distance S would increase.

In summary, the locating method, the locator, and the locating system for a HMD proposed in the disclosure capture an image of a reference object in an operating space to accordingly calculate a relative position of the HMD and the reference object so as to obtain locating information of the HMD in the operating space. Hence, the locating technique proposed in the disclosure may be achieved in a low cost and simple manner with no additional hardware equipment required to be setup in the operating space so that the practicability of the disclosure is assured.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

TABLE 1

| FOV | the user's head moving with an acceleration of "a" | the distance between the reference pattern 110' and the center C | Distance > S? | SD = 1.5 |
|---|---|---|---|---|
| 40° | move 30° to the left with an acceleration of "a" | d2 | Yes | Servo unit needs to move (30 × 1.5)° to the right with an acceleration of a to allow the reference pattern 110' to be at the center C |
| 40° | move 30° to the right with an acceleration of "a" | d3 | Yes | Servo unit needs to move (30 × 1.5)° to the left with an acceleration of a to allow the reference pattern 110' to be at the center C |
| 120° | move 30° to the left with an acceleration of "a" | d5 | No | Servo unit needs to move 30° to the right with an acceleration of a to allow the reference pattern 110' to be at the center C |
| 120° | move 30° to the right with an acceleration of "a" | d6 | No | Servo unit needs to move 30° to the left with an acceleration of a to allow the reference pattern 110' to be at the center C |

What is claimed is:

1. A method for locating a head-mounted display (HMD), wherein the method comprises steps of:
    providing and disposing a locator on the HMD, wherein the locator comprises an image capturing device, a communication interface and a motion sensor, and wherein the locator is connected to the HMD via the communication interface;
    capturing an image of a reference object in an operating space by using the image capturing device of the locator to generate a first reference object image;
    detecting movement and rotation of the locator by using the motion sensor of the locator to generate current motion data;
    calculating a relative position of the HMD and the reference object by the locator according to the first reference object image to obtain locating information of the HMD in the operating space, wherein a current relative coordinate of the HMD and the reference object is calculated by the locator according to a current image captured by the image capturing device, and the relative position of the HMD and the reference object is calculated by calibrating the current relative coordinate by the locator according to the current motion data; and
    transmitting the locating information to the HMD by the locator.

2. The method according to claim 1, wherein the reference object is an image having a direction and placed on a top side or a perpendicular side of the operating space.

3. The method according to claim 1, wherein the relative position of the HMD and the reference object is associated with a radial distance between the HMD and the reference object as well as a tilt angle and a rotation angle with respect to a horizontal plane between the HMD and the reference object, and wherein the locating information of the HMD is associated with an absolute position of the HMD in the operating space.

4. The method according to claim 1, wherein before the step of capturing the image of the reference objected in the operating space by using the image capturing device by the locator to generate the first reference object image, the method further comprises steps of:
    capturing an image of the reference object from an origin position straight toward the reference object by the locator to generate an origin reference object image corresponding to the origin position, and obtaining a distance between the locator and the reference object by the HMD to obtain an origin coordinate of the origin position;
    capturing images of the reference object respectively from a plurality of corner positions in the operating space by the locator to generate a corner reference object image respectively corresponding to each of the corner positions, and obtaining a corner coordinate of each of the corner positions by the HMD; and
    transmitting the origin coordinate and the corner coordinates to the locator by the HMD.

5. The method according to claim 4, wherein after the step of obtaining the corner coordinate of each of the corner positions by the HMD, the method further comprises a step of:
    defining an activity boundary of the HMD in the operating space by the HMD according to the corner coordinate of each of the corner positions.

6. The method according to claim 1, wherein the locator further comprises a time generator, and wherein the method further comprises a step of:
    generating current time data corresponding to the current motion data by using the time generator of the locator.

7. The method according to claim 6, wherein the step of calibrating the current relative coordinate by the locator according to the current motion data comprises:
    obtaining a rotation angle and an angle difference with respect to a horizontal plane of the image capturing device by the locator when the image capturing device captures the reference object image;
    calibrating the relative coordinate by the locator according to the rotation angle and the angle difference, and setting the calibrated relative coordinate as the relative position by the locator.

8. The method according to claim 6, wherein after the step of transmitting the locating information to the HMD by the locator, the method further comprises steps of:
    calculating a distance between the reference object appearing in the reference object image and an image center of the reference object image by the locator to generate a current distance, wherein the image center is a center point of the reference object image;
    calculating a difference between the current motion data and previous motion data by the locator to generate a current difference; and
    moving the image capturing device by the locator according to the current difference and the current distance.

9. The method according to claim 8, wherein the step of moving the image capturing device by the locator according to the current difference and the current distance comprises:
    determining whether the current difference is greater than a preset difference by the locator;
    in response to the current difference being greater than the preset difference, moving the image capturing device by a multiplier of the current distance, wherein the multiplier is greater than 1; and
    in response to the current difference not being greater than the preset difference, moving the image capturing device by the current distance.

10. The method according to claim 9, wherein the preset difference is associated with a system response time of the locator, and wherein the larger the system response time of the locator, the larger the preset difference.

11. The method according to claim 9, wherein the preset difference is associated with a field of view of the image capturing device, and wherein the larger the field of view of the image capturing device, the larger the preset difference.

12. A locator, disposed on a head-mounted display (HMD), and comprising:
    an image capturing device, configured to capture an image of a reference object in an operating space to generate a first reference object image;
    a communication interface, configured to connect to the HMD;
    a motion sensor, configured to detect movement and rotation of the locator to generate current motion data;
    a data storage device, configured to store data; and
    a processor, coupled to the image capturing device, the communication interface, the data storage device, and the motion sensor, and configured to calculate a relative position of the HMD and the reference object according to the first reference object image to obtain locating information of the HMD in the operating space and transmit the locating information to the HMD by the locator,
    wherein the processor calculates a current relative coordinate of the HMD and the reference object according to a current image captured by the image capturing device and calibrates the current relative coordinate according to the current motion data to calculate the relative position of the HMD and the reference object.

13. The locator according to claim 12, wherein the reference object is an image having a direction and placed on a top side or a perpendicular side of the operating space.

14. The locator according to claim 12 further comprising:
a time generator, coupled to the processor, and configured to generate current time data corresponding to the current motion data.

15. The locator according to claim 12 further comprising:
a servo unit, wherein the processor further calculates a distance between the reference object appearing in the reference object image and an image center of the reference object image to generate a current distance, calculates a difference between the current motion data and previous motion data to generate a current difference, and controls the servo unit to move the image capturing device according to the current difference and the current distance, wherein the image center is a center point of the reference object image.

16. A locating system comprising:
a head-mounted display (HMD); and
a locator comprising an image capturing device, disposed on and connected to the HMD, and configured to capture an image of a reference object in an operating space to generate a first reference object image, calculate a relative position of the HMD and the reference object according to the first reference object image to obtain locating information of the HMD in the operating space, and transmit the locating information to the HMD,
wherein the locator is configured to detect movement and rotation to generate current motion data, calculate a current relative coordinate of the HMD and the reference object according to a current image, and calibrate the current relative coordinate according to the current motion data to calculate the relative position of the HMD and the reference object.

17. The locating system according to claim 16, wherein the reference object is an image having a direction and placed on a top side or a perpendicular side of the operating space.

18. The locating system according to claim 16, wherein the locator is further configured to generate current time data corresponding to the current motion data.

19. The locating system according to claim 16, wherein the locator further calculates a distance between the reference object appearing in the reference object image and an image center of the reference object image to generate a current distance, calculates a difference between the current motion data and previous motion data by the locator to generate a current difference, and move the image capturing device according to the current difference and the current distance, wherein the image center is a center point of the reference object image.

20. A method for locating a head-mounted display (HMD), wherein the method comprises steps of:
providing and disposing a locator on the HMD, wherein the locator comprises an image capturing device and a communication interface, and wherein the locator is connected to the HMD via the communication interface;
capturing an image of a reference object in an operating space by using the image capturing device of the locator to generate a first reference object image;
calculating a relative position of the HMD and the reference object by the locator according to the first reference object image to obtain locating information of the HMD in the operating space; and
transmitting the locating information to the HMD by the locator,
wherein the relative position of the HMD and the reference object is associated with a radial distance between the HMD and the reference object as well as a tilt angle and a rotation angle with respect to a horizontal plane between the HMD and the reference object, and wherein the locating information of the HMD is associated with an absolute position of the HMD in the operating space.

21. A method for locating a head-mounted display (HMD), wherein the method comprises steps of:
providing and disposing a locator on the HMD, wherein the locator comprises an image capturing device and a communication interface, and wherein the locator is connected to the HMD via the communication interface;
capturing an image of a reference object in an operating space by using the image capturing device of the locator to generate a first reference object image, wherein the reference object is an image having a fixed direction and fixedly placed on a top side or a perpendicular side of the operating space;
calculating a relative position of the HMD and the reference object by the locator according to the first reference object image to obtain locating information of the HMD in the operating space; and
transmitting the locating information to the HMD by the locator.

22. A locator, disposed on a head-mounted display (HMD), and comprising:
an image capturing device, configured to capture an image of a reference object in an operating space to generate a first reference object image, wherein the reference object is an image having a fixed direction and fixedly placed on a top side or a perpendicular side of the operating space;
a communication interface, configured to connect to the HMD;
a data storage device, configured to store data; and
a processor, coupled to the image capturing device, the communication interface, and the data storage device, and configured to calculate a relative position of the HMD and the reference object according to the first reference object image to obtain locating information of the HMD in the operating space and transmit the locating information to the HMD by the locator,
wherein the relative position of the HMD and the reference object is associated with a radial distance between the HMD and the reference object as well as a tilt angle and a rotation angle with respect to a horizontal plane between the HMD and the reference object, and wherein the locating information of the HMD is associated with an absolute position of the HMD in the operating space.

23. A locating system comprising:
a head-mounted display (HMD); and
a locator comprising an image capturing device, disposed on and connected to the HMD, and configured to capture an image of a reference object in an operating space to generate a first reference object image, calculate a relative position of the HMD and the reference object according to the first reference object image to obtain locating information of the HMD in the operating space, and transmit the locating information to the HMD, wherein the reference object is an image having a fixed direction and fixedly placed on a top side or a perpendicular side of the operating space, wherein the relative position of the HMD and the reference object is associated with a radial distance between the HMD and the reference object as well as a tilt angle and a rotation angle with respect to a horizontal plane between the HMD and the reference object, and wherein the locating information of the HMD is associated with an absolute position of the HMD in the operating space.

* * * * *